United States Patent Office 3,064,061
Patented Nov. 13, 1962

3,064,061
PROCESS FOR THE CATALYTIC TREATMENT OF POLYPHENYL HYDROCARBONS
Daniel A. Scola, Andover, John O. Smith, Swampscott, and Robert J. Wineman, Concord, Mass., assignors, by mesne assignments, to the United States of America as represented by the United States Atomic Energy Commission
No Drawing. Filed Aug. 19, 1960, Ser. No. 50,561
6 Claims. (Cl. 260—668)

This invention relates to polyphenyls and mixtures thereof. More particularly, the invention relates to a process for treating polyphenyls and mixtures thereof.

Polyphenyls and particularly terphenyls are quite useful as heat transfer media in high temperature operations. In general, they are non-corrosive and do not decompose under normal operating conditions. However, there is a tendency for the polyphenyls to polymerize until 6 or 8 or more phenyl groups are combined. The polymerization gradually reduces their values as heat exchange media to the point where they must be replaced.

One object of this invention is to provide a process for reclaiming polyphenyl heat transfer media.

Another object is to hydrocrack polyphenyls and mixtures of polyphenyl.

A further object is to provide a process for treating polyphenyls permitting a greater degree of control of the end products than is normally available.

These and other objects are attained by passing the polyphenyls in the vapor phase over a dual function catalyst system in a hydrogen atmosphere at substantially atmospheric pressure and at an elevated temperature.

The following examples are given in illustration of this invention and are not to be considered as limitations thereon. Where parts are mentioned, they are parts by weight.

EXAMPLE I

Pack a suitable reaction vessel such as a standard reaction tube with a catalyst consisting of finely-divided alumina having deposited thereon about 1% by weight of platinum. Purge the reaction system with nitrogen while raising the temperature to about 400° C. Pass hydrogen through the heated catalyst until the catalyst is activated and at the same time raise the catalyst temperature to 550° C. Pass molten meta-terphenyl through a preheater to raise its temperature to about 500° C. at which temperature it is a gas. While maintaining the catalyst temperature at 550° C., mix hydrogen with the meta-terphenyl gas and pass the mixture through the catalyst at such a rate that the meta-terphenyl vapors carried by the hydrogen are in contact with the catalyst for about 15 seconds. About five volumes of hydrogen should be used per volume of meta-terphenyl vapor. Collect the effluent from the reaction vessel in a series of cooled receivers. The product of the reaction is a mixture of biphenyl, ortho-terphenyl, para-terphenyl, benzene, toluene, and unreacted meta-terphenyl. The mixture may be separated into its components by distillation. Advantageously, the meta-terphenyl or the mixture of terphenyls is recycled through the reaction vessel. Approximately 44% of the meta-terphenyl is converted into biphenyl and benzene per pass through the reaction zone. The selectivity of this catalyst is about 45%. The yield of benzene and converted polyphenyl per pass is about 20%.

If the amount of platinum on activated alumina is reduced to 0.1%, the temperature increased to 600° C. and the amount of hydrogen increased to 7.7 volumes per volume of metaterphenyl, the selectivity is 39% and the yield and conversion per pass are respectively 6.4% and 16%.

Table I illustrates the results of using a variety of the catalysts at 425–550° C., contact times of 7–14 seconds and hydrogen to meta-terphenyl ratios varying between 2 and 10.

For the purposes of this invention yield, selectivity and conversion are defined as follows:

$$\text{Percent yield} = \frac{\text{weight of desired product}}{\text{initial weight of feed}}$$

$$\text{Percent selectivity} = \frac{\text{weight of desired product}}{\text{weight of feed converted}}$$

$$\text{Percent conversion} = \frac{\text{weight of feed converted}}{\text{initial weight of feed}}$$

The "desired product" may be benzene and polyphenyls of lesser degree of polymerization, isomers of the starting product or triphenylene as desired. For the foregoing examples and Tables I and II, the desired product is the total of benzene and polyphenyl of lesser degree of polymerization.

Table I

| Catalyst | Percent Selectivity | Percent Yield | Percent Conversion |
|---|---|---|---|
| 0.1% platinum on alumina | 39 | 6.4 | 16 |
| 0.5% platinum on alumina | 50 | 5.1 | 10 |
| 1.0% platinum on alumina | 45 | 20 | 44 |
| 0.6% platinum on silica | 45 | 11 | 26 |
| 10% nickel on alumina | 26 | 14 | 54 |
| 13% cobalt-molybdena on alumina | 29 | 9 | 36 |
| 0.6% platinum on alumina | 25 | 7 | 29 |
| 5% nickel on kieselguhr | 19 | 19 | 98 |
| 0.5% ruthenium on alumina | 15 | 9.5 | 61 |
| 10% molybdena on alumina | 13 | 2.5 | 19 |
| 0.5% rhodium on alumina | 9.8 | 5.2 | 53 |
| 1% platinum on silica-alumina | 2.9 | 1.0 | 34 |
| 0.5% palladium on alumina | 11 | 3 | 26 |
| 10% iron on silica-alumina | 9.2 | 1.5 | 16 |
| 6.5% nickel on silica-alumina | 3.4 | 2.7 | 75 |
| 10% chromia on alumina | 12 | 1.6 | 13 |

Using 1% platinum on alumina and a temperature of 600° C., a mixture of polyphenols containing some polyphenyls having as high as 8 phenyl groups is hydrocracked to the following extent: 19% selectivity, 19% yield per pass, and 100% conversion per pass.

Similar results are obtained in the treatment of biphenyl and para-terphenyl. Examples of the results obtainable are shown in Table II.

Table II

| Polyphenyl | Catalyst | Percent Selectivity | Percent Yield | Percent Conversion |
|---|---|---|---|---|
| Biphenyl | 1% platinum on alumina | 68 | 18 | 26 |
| Para-terphenyl | do | 63 | 24 | 37 |
| Polyphenyl mixture | do | 19 | 19 | 100 |

The process of this invention should be controlled carefully to obtain optimum cleavage of the carbon-carbon bond between phenyl rings, isomerization and production of triphenylene, and minimum rupture or hydrogenation of the phenyl ring structure.

Simultaneously with the cleavage of the carbon-carbon bond between phenyl rings, there occurs substantial isomerization of the polyphenyls. The total percent isomerization and the percent isomerization selectivity obtained using the process set forth in Example I with various catalysts is set forth in Table III.

Table III
ISOMERIZATION OF META-TERPHENYL WITH VARIOUS CATALYSTS

| Catalyst | Percent Isomerization | |
|---|---|---|
| | Total | Selectivity |
| 0.6% platinum-silica | 39 | 54 |
| 1% platinum-silica-alumina | 37 | 52 |
| 10-12% molybdena-alumina | 32 | 61 |
| 11% nickel-kaolin | 30 | 59 |
| 0.2% palladium-silica | 29 | 69 |
| 6.5% nickel-silica-alumina | 26 | 32 |
| 0.1% platinum-alumina | 22 | 58 |
| 13% cobalt-molybdena-alumina | 21 | 38 |
| nickel-cobalt-molybdena | 18 | 43 |
| 0.5% platinum-alumina | 18 | 36 |
| copper-alumina | 11 | 48 |
| 10-12% cobalt-alumina | 9.5 | 53 |
| 0.5% palladium-alumina | 9.3 | 27 |
| iron-chromia-alumina | 4.7 | 61 |

A third competing reaction occurs which can be promoted by using temperatures of 600–650° C. This reaction produces triphenylene in relatively high yields. Table IV sets forth yields obtainable using various catalysts at specfied contact times and temperatures using from 2 to 10 mols of hydrogen per mol of meta-terphenyl.

Table IV
PRODUCTION OF TRIPHENYLENE

| Temp., ° C. | Contact Time, secs. | Percent Yield | Catalyst |
|---|---|---|---|
| 600 | 11 | 56 | 0.6% platinum on alumina. |
| 650 | 10 | 50 | Do. |
| 630 | 11 | 50 | 8-10% nickel-chromia on alumina. |
| 600 | 11 | 51 | 10-12% molybdena on alumina. |
| 600 | 10.4 | 37 | 6.5% nickel on silica-alumina. |
| 600 | 10 | 45 | 13% cobalt-molybdena on alumina. |
| 600 | 10 | 28 | 10-12% cobalt on alumina. |
| 600 | 10 | 34 | 1% platinum on alumina. |

In the first place, the process is a vapor phase process in which hydrogen and polyphenyl vapors are mixed and passed through the catalyst bed where the reaction takes place and then to the product receiver.

Secondly, the hydrogen must be used in excess as compared to the polyphenyl. From 2 to 10 molar volumes of hydrogen should be used for each molar volume of polyphenyl. The excess hydrogen can be recovered and recycled. The excess of hydrogen prevents coking during the reaction.

Thirdly, the temperature of the process is restricted to a range of 400–650° C. Below 400° C. the hydrocracking efficiency drops rapidly to zero and above 650° C. excessive coking of the reactant occurs with consequent fouling of the catalyst. Temperatures between 500 and 600° C. represent optimum conditions.

Fourthly, the contact time, i.e. the length of time during which the reactants are in the catalyst zone, should be limited to from 0.1 to 20 seconds. For most cases, contact times of between 10 and 15 seconds are satisfactory. However, the most active catalysts will cause extensive decomposition unless the contact time is drastically reduced to a second or fraction of a second. On the other hand, some of the slower acting catalysts require contact times longer than 15 seconds.

It is desirable to exclude oxygen from the reaction zone to prevent decomposition of the polyphenyls.

The catalysts used in the process of this invention are dual function systems in which one component is a metal or oxide thereof having hydrogenation-dehydrogenation activity and the other component is an active support of acidic character. Platinum is the most active of the metal components and is the most selective in directing the reaction towards cleavage of the carbon-carbon bond between phenyl rings.

Nickel and cobalt are next in order of activity and generally should be used in higher amounts up to as much as 50% by weight of the total catalyst.

Iron, ruthenium, rhodium and palladium are somewhat less active. Chromium and molybdenum may be used on the active support, but better results are obtained by employing the oxides thereof. In some cases it may be desirable to complex two or more of the metals or metal oxides such, for example, as a cobalt-molybdena complex deposited on alumina.

The active supports which are operable in this invention are materials having acidic characteristics such as alumina, silica, silica-alumina combinations, boria-alumina, magnesia-alumina and natural silicates such as kieselguhr. It is desirable to activate the supports by conventional methods such as heat treatments to increase the efficiency of the catalyst systems.

The amount of metal or metal oxide deposited on the support may range from 0.1% to 50% by weight of the catalyst combination. For platinum, palladium, rhodium and ruthenium, it is not necessary to use more than 1% by weight. For the other catalysts, 1% by weight is operable but better results are attained by using larger amounts ranging as high as 50% by weight.

The process of the invention is applicable to polyphenyls containing from 2 to 8 phenyl groups. Higher polyphenyls will not have sufficient partial vapor pressure under the conditions of the process. Mixtures of such polyphenyls are produced by polymerization of benzene, biphenyl, terphenyls or mixtures thereof or any lower polyphenyl under heating at elevated temperatures, or by irradiation.

The pressure in the reaction system should be restricted to the range of atmospheric pressure to about 50 p.s.i.

There are three major competing reactions occurring during the process of this invention all of which lead to products useful in heat exchanger systems except benzene which is easily removed by conventional distillation. As a practical matter, the heterogeneous mixture produced by this process does not have to be separated into the individual components for the heat exchange use.

One reaction is the cleavage of the carbon-carbon bond between phenyl rings with simultaneous addition of one atom of hydrogen to each phenyl ring. This reaction serves to depolymerize the polyphenyls.

The second reaction is an isomerization reaction which serves to rearrange the phenyl rings.

The third reaction is the formation of triphenylene by a dehydrocyclization reaction. This reaction may be accelerated at the expense of the other two by maintaining the catalyst temperature at 600–650° C. Triphenylene itself may be used in heat exchangers.

All of the products of the three reactions can be separated from the mixed reaction product by conventional distillation, vacuum distillation, etc.

In any event the conditions of the reaction may be so regulated within the process of this invention as to favor either isomerization, cleavage, or dehydrocyclization.

Care must be taken to avoid conditions which promote hydrogenation of the phenyl rings, cleavage of the phenyl rings, and decomposition of the polyphenyls to coke. By operating within the limits of this invention, such undesirable results can be minimized if not completely eliminated.

It is obvious that many variations may be made in the processes described above without departing from the spirit and scope of this invention.

What is claimed is:

1. A process for treating polyphenyls which comprises passing polyphenyls containing from 2 to 8 phenyl groups over a dual function catalyst system in an atmosphere of hydrogen at 400–650° C. and a pressure range of from atmospheric pressure to about 50 p.s.i., said dual function catalyst system consisting of a metal component taken from the group consisting of iron, cobalt, nickel, chromium, molybdenum, ruthenium, rhodium, palladium, platinum, oxides of said metals, and complexes of said metals and said oxides with one another, deposited on an acidic support, from 0.1% to 50% by weight of said catalyst system being said metal component, the contact time of said polyphenyl with the dual function catalyst system ranging from 0.1 to 20 seconds.

2. A process as in claim 1 wherein the catalyst is 1% platinum on activated alumina.

3. A process as in claim 1 wherein the amount of hydrogen is regulated between 2 and 10 molar volumes per molar volume of polyphenyl.

4. A process as in claim 1 wherein the contact time is limited to 10 to 15 seconds.

5. A process as in claim 1 wherein the reaction temperature is from 500–600° C.

6. A process as in claim 1 in which the temperature range is 600–650° C. whereby the production of triphenylene is accelerated.

No references cited.